US012786553B2

(12) United States Patent
Kasugai

(10) Patent No.: US 12,786,553 B2
(45) Date of Patent: Nov. 3, 2026

(54) IMAGING APPARATUS, SOUND COLLECTION APPARATUS, AND IMAGING SYSTEM

(71) Applicant: Panasonic Intellectual Property Management Co., Ltd., Osaka (JP)

(72) Inventor: Hiroki Kasugai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 18/635,582

(22) Filed: Apr. 15, 2024

(65) Prior Publication Data

US 2024/0364999 A1 Oct. 31, 2024

(30) Foreign Application Priority Data

Apr. 28, 2023 (JP) ................................ 2023-074596

(51) Int. Cl.
*H04N 23/60* (2023.01)
*H04R 1/02* (2006.01)
*H04S 7/00* (2006.01)

(52) U.S. Cl.
CPC ............. *H04N 23/64* (2023.01); *H04R 1/028* (2013.01); *H04S 7/30* (2013.01); *H04R 2420/01* (2013.01); *H04R 2499/11* (2013.01)

(58) Field of Classification Search
CPC .......... H04R 1/245; H04R 1/04; H04R 1/083; H04R 3/005; H04R 5/027; H04R 19/04; H04R 2410/01; H04R 2420/07; H04S 2400/15; H04S 1/007; H03F 3/183; H03F 2200/03
USPC ............................................. 381/1, 91, 323
See application file for complete search history.

(56) References Cited

U.S. PATENT DOCUMENTS 5,099,446 A 3/1992 Sako et al.
2002/0090141 A1* 7/2002 Kenyon ................. G06T 9/001 382/239
2009/0316916 A1* 12/2009 Haila .................... H04R 17/02 381/56

(Continued)

FOREIGN PATENT DOCUMENTS

JP S63-282800 A 11/1988
JP H02-305027 A 12/1990
JP 2020-156076 A 9/2020

*Primary Examiner* — William A Jerez Lora
(74) *Attorney, Agent, or Firm* — Renner, Otto, Boisselle & Sklar, LLP

(57) ABSTRACT

An imaging apparatus includes: an image sensor that captures a subject image to generate image data; an audio processor that generates audio data associated with the image data; and a receiver that receives a first audio signal and a second audio signal from an external sound collection apparatus. The first audio signal indicates a result of first amplification conversion performed on input sound in the sound collection apparatus. The second audio signal indicates a result of second amplification conversion performed on the input sound in the sound collection apparatus, the second amplification conversion being different from the first amplification conversion. The audio processor performs processing to combine the first and second audio signals, which received from the receiver as input, with each other, to generate the audio data of a sound collection result indicating the input sound in a predetermined data format.

7 Claims, 9 Drawing Sheets

(56) References Cited

U.S. PATENT DOCUMENTS

| | | | | |
|---|---|---|---|---|
| 2015/0280648 | A1* | 10/2015 | Vitali ...................... | H03M 1/12<br>327/355 |
| 2020/0296279 | A1 | 9/2020 | Kasugai | |
| 2023/0259323 | A1* | 8/2023 | Beavis .................... | G06F 3/162<br>715/716 |
| 2024/0114286 | A1* | 4/2024 | Anderson .............. | H04R 1/245 |

* cited by examiner

SOUND VOLUME
TIME
A1

+Ma
-Ma
A2

+Ma
-Ma
A3

+Mb
-Mb
A20

+Mb
+Mt
-Mt
-Mb
A30

+Mb
+Mt
-Mt
-Mb
A10

IMAGING APPARATUS, SOUND COLLECTION APPARATUS, AND IMAGING SYSTEM

TECHNICAL FIELD

The present disclosure relates to an imaging apparatus that receives an audio signal from a sound collection apparatus, a sound collection apparatus, and an imaging system including these apparatuses.

BACKGROUND ART

JP 63-282800 A discloses a data processing device that suitably performs arithmetic processing on floating point data in order to process an audio signal. This data processing device is provided with a significand part register and an exponent part register that store a significand part and an exponent part of floating point data, respectively. The data processing device performs arithmetic processing on an audio signal that is fixed point data of two left and right channels to create floating point data.

SUMMARY

The present disclosure provides an imaging apparatus, a sound collection apparatus, and an imaging system that allow easy acquisition of audio data indicating a sound collection result in a predetermined data format by using the sound collection apparatus and the imaging apparatus.

An imaging apparatus according to the present disclosure includes: an image sensor that captures a subject image to generate image data; an audio processor that generates audio data associated with the image data; and a receiver that receives a first audio signal and a second audio signal from an external sound collection apparatus. The first audio signal indicates a result of first amplification conversion performed on input sound in the sound collection apparatus. The second audio signal indicates a result of second amplification conversion performed on the input sound in the sound collection apparatus, the second amplification conversion being different from the first amplification conversion. The audio processor performs processing to combine the first and second audio signals with each other, to generate the audio data of a sound collection result, the first and second audio signals being received from the receiver as input, the audio data of the sound collection result indicating the input sound in a predetermined data format.

A sound collection apparatus in the present disclosure is a sound collection apparatus that transmits an audio signal to an imaging apparatus. The sound collection apparatus includes: a sound input interface that acquires input sound; a first signal processor that performs first amplification conversion on the input sound to generate a first audio signal; a second signal processor that performs second amplification conversion on the input sound to generate a second audio signal, the second amplification conversion being different from the first amplification conversion; and a transmitter that transmits the first audio signal and the second audio signal to the imaging apparatus.

An imaging system according to the present disclosure includes the sound collection apparatus; and the imaging apparatus that receives the first and second audio signals as input from the sound collection apparatus, and performs processing to combine the received first and second audio signals with each other, to generate the audio data of a sound collection result indicating the input sound in a predetermined data format.

According to the imaging apparatus, the sound collection apparatus, and the imaging system of the present disclosure, it is possible to facilitate obtaining audio data indicating a sound collection result in a predetermined data format by using the sound collection apparatus and the imaging apparatus.

DETAILED DESCRIPTION

Hereinafter, embodiments will be described in detail with reference to the drawings as appropriate. However, detailed description of an already well-known matter and overlapping description for substantially the same configuration may be omitted. Note that the accompanying drawings and description below are provided to enable those skilled in the art to sufficiently understand the present disclosure, and these are not intended to limit the subject matter described in the claims.

First Embodiment

1. Configuration

The imaging system according to a first embodiment of the present disclosure will be described with reference to FIG. 1.

1-1. System Overview

Figure 1:
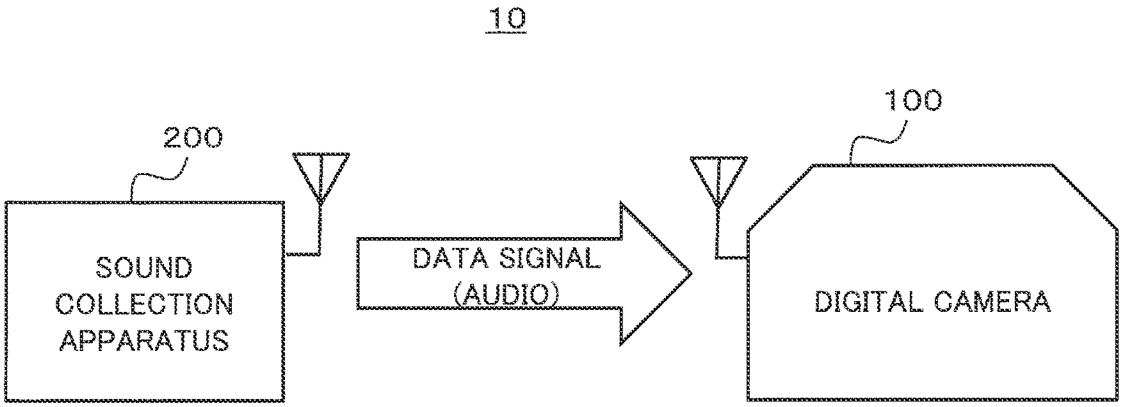
FIG. 1 is a diagram for explaining an imaging system according to a first embodiment of the present disclosure.

As illustrated in FIG. 1, an imaging system 10 according to the present embodiment includes a digital camera 100 and a sound collection apparatus 200, for example. In the present system 10, the digital camera 100 and the sound collection apparatus 200 are connected by wireless communication such as Bluetooth.

The present system 10 realizes float recording using the sound collection apparatus 200 in moving image shooting by the digital camera 100, for example. The float recording is a recording function capable of keeping resolution of each sound from relatively larger sound to smaller sound by a predetermined data format such as a float format.

In realizing such float recording, the imaging system 10 according to the present embodiment utilizes a calculation function of the digital camera 100 to employ a simple configuration in the sound collection apparatus 200. According to the present system 10, the user of the digital camera 100 can easily obtain a recording result of a high dynamic range and high accuracy in moving image shooting by preparing the sound collection apparatus 200 having a simple configuration, for example.

Hereinafter, a configuration of the digital camera 100 and the sound collection apparatus 200 in the present system 10 will be described.

1-2. Configuration of Digital Camera

A configuration of the digital camera 100 in the present embodiment will be described with reference to FIG. 2.

Figure 2:
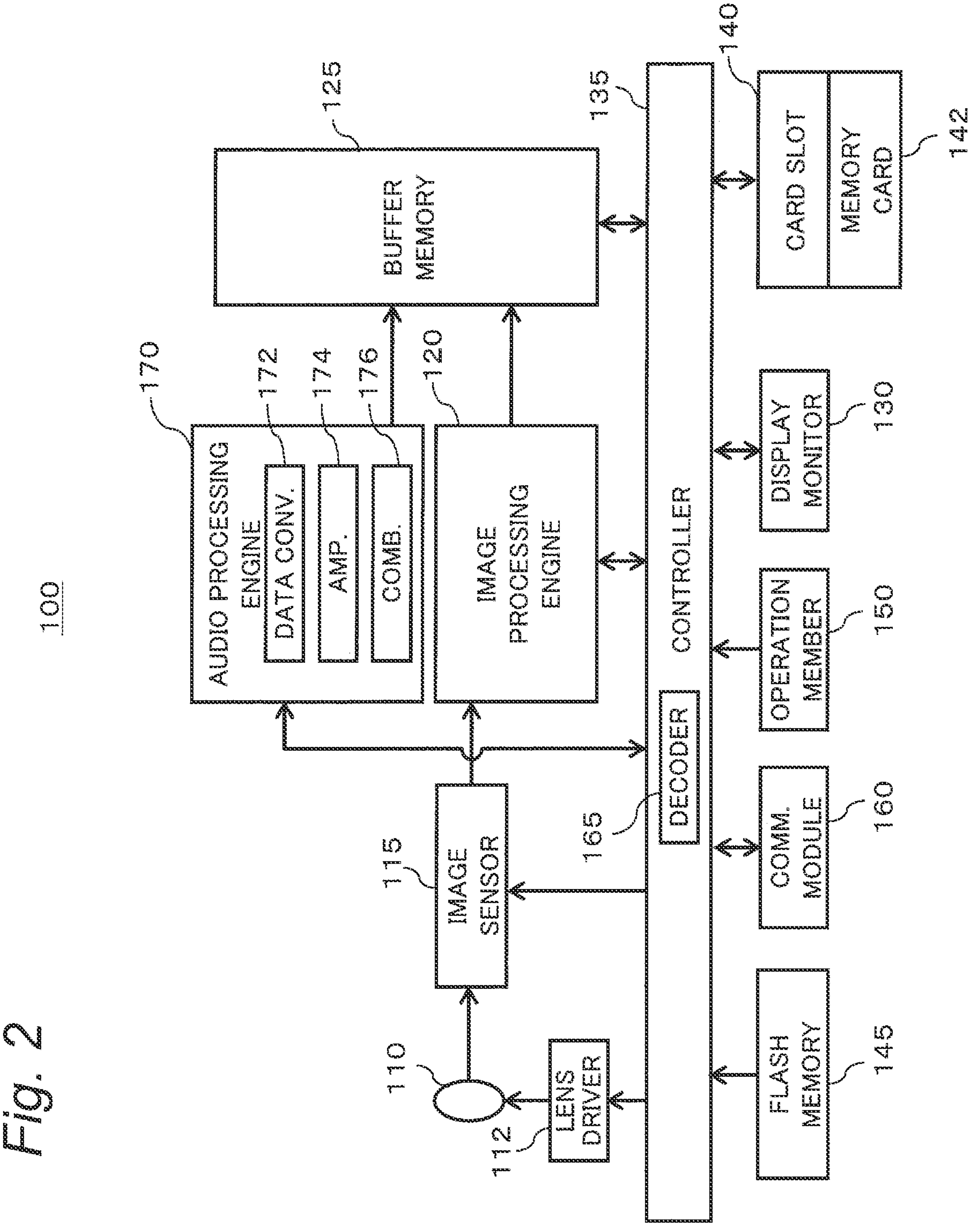
FIG. 2 is a diagram illustrating a configuration of a digital camera in the imaging system.

FIG. 2 is a diagram illustrating a configuration of the digital camera 100 according to the present embodiment. The digital camera 100 according to the present embodiment includes an image sensor 115, an image processing engine 120, a display monitor 130, and a controller 135. Furthermore, the digital camera 100 includes a buffer memory 125, a card slot 140, a flash memory 145, an operation member 150, a communication module 160, and an audio processing engine 170. In addition, the digital camera 100 includes an optical system 110 and a lens driver 112, for example.

The optical system 110 includes a focus lens, a zoom lens, an optical image stabilizer (OIS), an aperture, a shutter, and the like. The focus lens is a lens for changing the focus state of the subject image formed on the image sensor 115. The zoom lens is a lens for changing the magnification of the subject image formed by the optical system. Each of the focus lenses and the like includes one or more lenses.

The lens driver 112 drives a focus lens and the like in the optical system 110. The lens driver 112 includes a motor, and moves a focus lens along an optical axis of the optical system 110 based on control of the controller 135. The configuration for driving the focus lens in the lens driver 112 can be implemented with a DC motor, a stepping motor, a servo motor, an ultrasonic motor, or the like.

The image sensor 115 captures a subject image formed via the optical system 110 to generate imaging data. The imaging data is image data indicating an image captured by the image sensor 115. The image sensor 115 generates image data for a new frame at a predetermined frame rate (e.g., 30 frames/second). A generation timing of imaging data and electronic shutter operation in the image sensor 115 are controlled by the controller 135. As the image sensor 115, various image sensors such as a CMOS image sensor, a CCD image sensor, or an NMOS image sensor can be used.

The image sensor 115 performs imaging operations of a moving image and a still image, an imaging operation of a through image, and the like. The through image is mainly a moving image, and is displayed on the display monitor 130 in order to allow the user to determine composition for capturing a still image, for example. Each of the through image, the moving image, and the still image is an example of the captured image in the present embodiment. The image sensor 115 is an example of an image sensor in the present embodiment.

The image processing engine 120 performs various kinds of processing on the imaging data output from the image sensor 115 to generate image data, or performs various kinds of processing on the image data to generate images to be displayed on the display monitor 130. Various kinds of processing include white balance correction, gamma correction, YC conversion processing, electronic zoom processing, compression processing, expansion processing, and the like, but are not limited to these. The image processing engine 120 may be configured with a hard-wired electronic circuit, or may be configured with a microcomputer, a processor, or the like using a program.

The display monitor 130 is an example of a display that displays various kinds of information. For example, the display monitor 130 displays an image (through image) indicated by image data which is captured by the image sensor 115 and on which image processing by the image processing engine 120 is performed. In addition, the display monitor 130 displays a menu screen or the like for a user to make various settings for the digital camera 100. The display monitor 130 can include a liquid crystal display device or an organic EL device, for example.

The operation member 150 is a general term for hard keys such as operation buttons and operation levers provided on the exterior of the digital camera 100, and receives operations by a user. For example, the operation member 150 includes a release button, a mode dial, a touch panel, a cursor button, and a joystick. When receiving operation by the user, the operation member 150 transmits an operation signal corresponding to user operation to the controller 135.

The controller 135 integrally controls entire operation of the digital camera 100. The controller 135 includes a CPU and the like, and the CPU executes a program (software) to realize a predetermined function. For example, the controller 135 functions as a decoder 165 that decodes a signal received from the communication module 160.

The decoder 165 does not need to be realized by a function of the controller 135, and may be incorporated in the communication module 160, for example. The controller 135 may include, instead of the CPU, a processor including a dedicated electronic circuit designed to realize a predetermined function. That is, the controller 135 can be realized by various processors such as a CPU, an MPU, a GPU, a DSU, an FPGA, and an ASIC. The controller 135 may include one or more processors. The controller 135 may include one semiconductor chip together with the image processing engine 120 and the like.

The buffer memory 125 is a recording medium that functions as a work memory of the image processing engine 120 and the controller 135. The buffer memory 125 is implemented by a dynamic random-access memory (DRAM) or the like. The flash memory 145 is a non-volatile recording medium. Further, although not illustrated, the controller 135 may include various internal memories, and e.g., may incorporate a ROM. The ROM stores various programs to be executed by the controller 135. Further, the controller 135 may incorporate a RAM that functions as a work area of a CPU.

The card slot 140 is a means into which a detachable memory card 142 is inserted. The card slot 140 can connect the memory card 142 electrically and mechanically. The memory card 142 is an external memory including a recording element such as a flash memory inside. The memory card 142 can store data such as image data generated by the image processing engine 120.

The communication module 160 is a module (circuit) connected to an external device such as the sound collection apparatus 200 in accordance with a predetermined communication standard such as Bluetooth Low Energy (BLE). For example, the communication module 160 performs wireless communication of an audio signal in the LE Audio standard. Communication by the communication module 160 is not limited to wireless communication, and may be wired communication. The communication standard of the communication module 160 is not particularly limited, and may be, e.g., USB, HDMI (registered trademark), IEEE 802.11, Wi-Fi, or the like. The communication module 160 is an example of a receiver of the digital camera 100 in the present embodiment, and may be an example of a transmitter or a communication interface of the digital camera 100.

The audio processing engine 170 performs various audio processing on an audio signal acquired from the outside of the digital camera 100, to generate audio data as a processing result, for example. The audio processing engine 170 is an example of an audio processor in the present embodiment.

As illustrated in FIG. 2, the audio processing engine 170 of the present embodiment includes a data conversion unit 172, an amplification unit 174, and a combining unit 176, for example. Each of the units 172 to 176 is a functional configuration that performs arithmetic processing for realizing float recording (details will be described later). The audio processing engine 170 may be configured integrally with one or both of the image processing engine 120 and the controller 135.

The digital camera 100 may include a built-in microphone, and the audio processing engine 170 may perform audio processing on a sound collected by such a microphone. Further, the digital camera 100 may include an input terminal for connecting an external microphone, a signal processing circuit, and the like.

1-3. Configuration of Sound Collection Apparatus

A configuration of the sound collection apparatus 200 according to the present embodiment will be described with reference to FIGS. 3 to 4.

Figure 3:
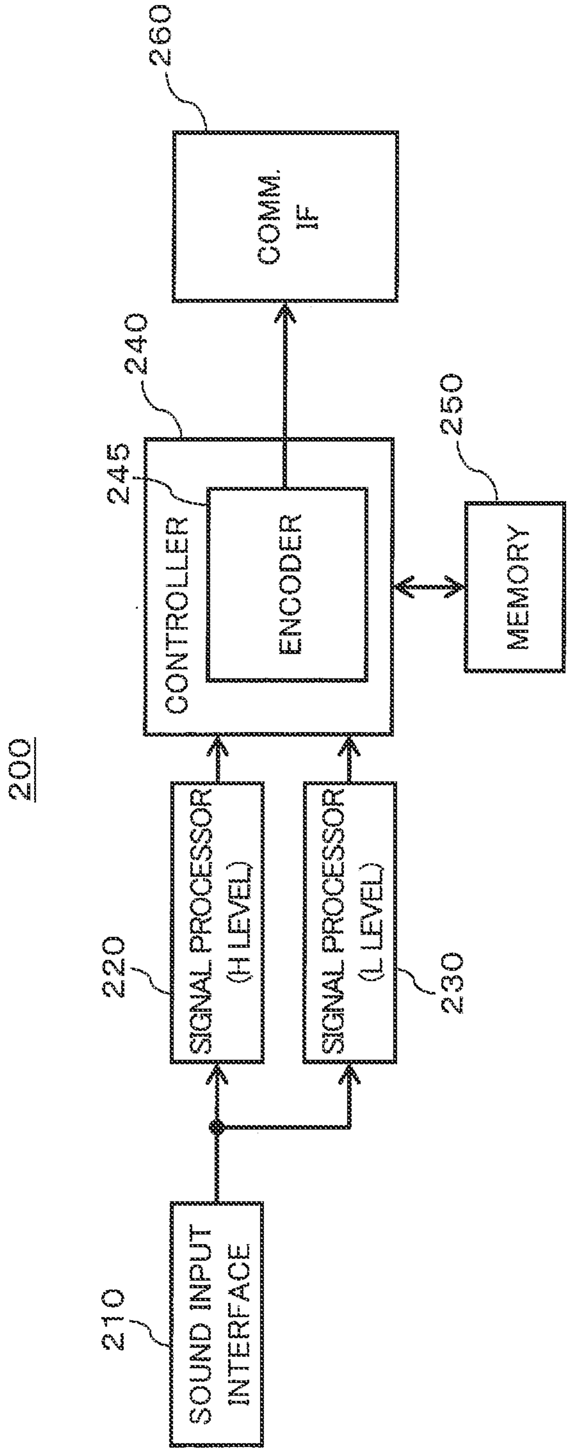
FIG. 3 is a diagram illustrating a configuration of a sound collection apparatus in the imaging system.

FIG. 3 illustrates a configuration of the sound collection apparatus 200 in the present system. FIG. 4 illustrates a circuit configuration for float recording in the present system 10.

As illustrated in FIG. 3, the sound collection apparatus 200 of the present embodiment includes a sound input interface 210, a plurality of signal processors 220 and 230, a controller 240, a memory 250, and a communication interface 260, for example. The sound collection apparatus 200 is a device that performs sound collection for float recording using an external microphone, for example.

The sound input interface 210 includes an input terminal connected to one or more external microphones, for example. The sound input interface 210 acquires input sound of one channel by inputting, to the sound collection apparatus 200, an analog signal indicating sound collected with one monaural microphone, for example.

The sound input interface 210 is connected to two of the signal processors 220 and 230 that are parallel to the input sound of one channel. The sound input interface 210 may acquire the input sound of multiple channels, and may be stereo input, for example. The sound collection apparatus 200 may be configured integrally with a microphone. In this case, the sound input interface 210 may be a microphone of the sound collection apparatus 200.

Figure 4:
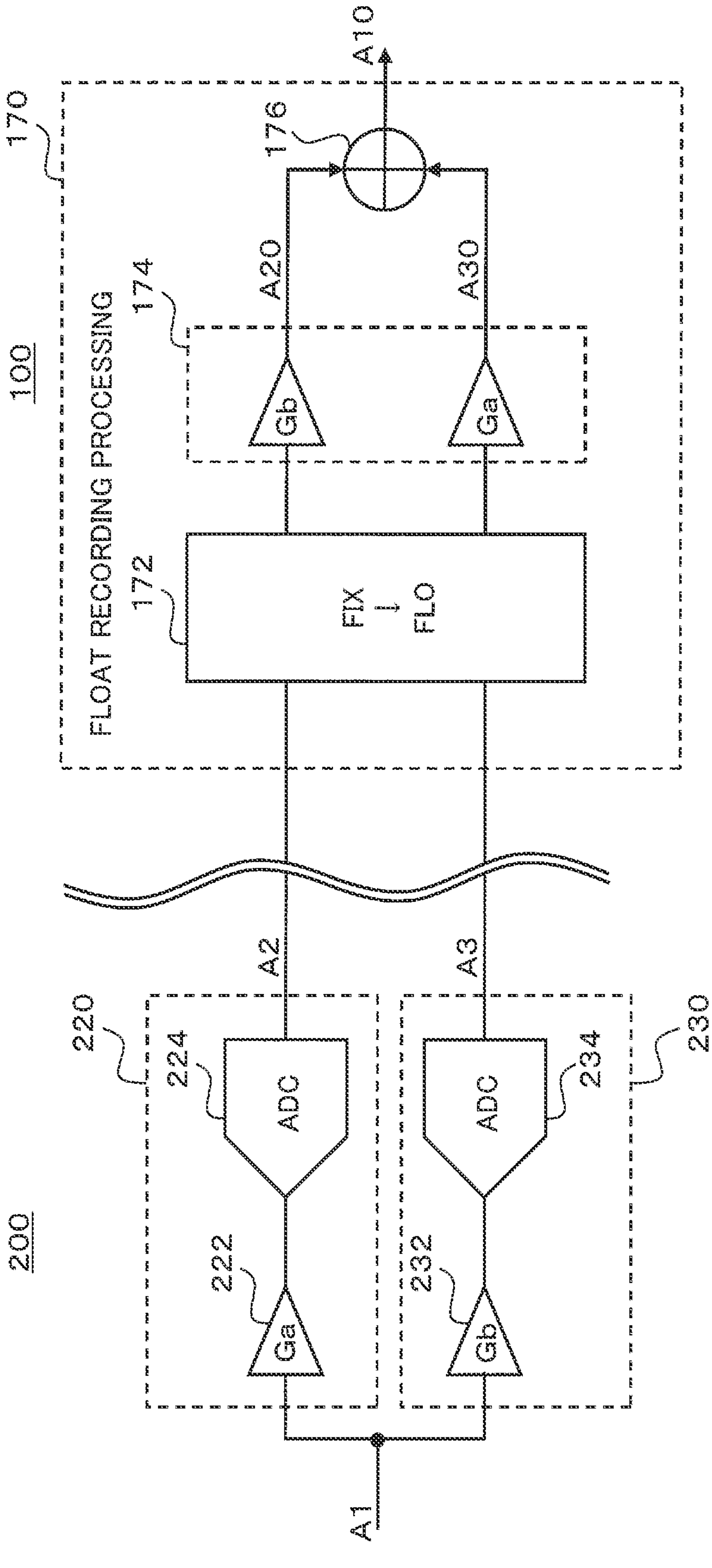
FIG. 4 is a diagram illustrating a circuit configuration for float recording in the imaging system.

For example, as illustrated in FIG. 4, the signal processors 220 and 230 include a signal processing circuit including amplifiers 222 and 232 and analog-to-digital (A/D) converters 224 and 234, respectively. The signal processors 220 and 230 include the high (H) level signal processor 220 and the low (L) level signal processor 230 in which different gains Ga and Gb are set so as to share an entire dynamic range of the sound collection apparatus 200.

For the amplifier 222 of the H level signal processor 220, the gain Ga is set so as to reduce influence of circuit noise from the viewpoint of accurately collecting input sound having a relatively smaller volume, for example. For example, the gain Ga is larger than the gain Gb of the L level signal processor 230. According to this, the H level signal processor 220 has a dynamic range on the small volume side in the sound collection apparatus 200.

For the amplifier 232 of the L level signal processor 230, the gain Gb is set so as to reduce saturation distortion of a signal waveform from the viewpoint of accurately collecting input sound having a relatively large volume, for example. According to this, in the sound collection apparatus 200, the L level signal processor 230 has a dynamic range on the small volume side.

For example, the dynamic range of the H level signal processor 220 and the dynamic range of the L level signal processor 230 are continuous, and may be partially overlapped. The A/D converters of the signal processors 220 and 230 have a common circuit characteristic such as resolution. One or more of the signal processors 220 and 230 may be integrated on an IC chip.

The controller 240 controls overall operation of the sound collection apparatus 200, for example. For example, the controller 240 includes a CPU or an MPU that implements a predetermined function in cooperation with software. For example, the controller 240 serves as an encoder 245 that encodes a signal transmitted from the communication interface 260.

The encoder 245 does not need to be implemented by a function of the controller 240, and may be incorporated in the communication interface 260, for example. The controller 240 may be a hardware circuit such as a dedicated electronic circuit or a reconfigurable electronic circuit designed to implement a predetermined function. The controller 240 may include various semiconductor integrated circuits such as a CPU, an MPU, a microcomputer, a DSP, an FPGA, and an ASIC.

The memory 250 includes a ROM and a RAM that store a program and data necessary for implementing a function of the sound collection apparatus 200. The memory 250 stores information indicating each gain in the signal processors 220 and 230, for example.

The communication interface 260 is a module (circuit) that is connected to an external device according to a predetermined communication standard such as BLE. For example, the communication interface 260 performs wireless communication of an audio signal in the LE Audio standard. Communication by the communication interface 260 is not limited to wireless communication, and may be wired communication. The communication standard of the communication interface 260 is not particularly limited, and may be, for example, USB, HDMI, IEEE 802.11, Wi-Fi, or the like. The communication interface 260 is an example of a transmitter of the sound collection apparatus 200 in the present embodiment, and may be an example of a receiver of the sound collection apparatus 200.

2. Operation

Operation of the imaging system 10 configured as described above will be described below.

The sound collection apparatus 200 (FIG. 3) of the present embodiment acquires input sound such as an environmental sound in a shooting environment of the present system 10 from the sound input interface 210, and performs two types of amplification conversion on the input sound by the H level signal processor 220 and the L level signal processor 230. The sound collection apparatus 200 according to the present embodiment generates a data signal including a result of the two types of amplification conversion, and transmits the data signal from the communication interface 260 to the digital camera 100 (FIG. 1).

In the present embodiment, for example, in response to receiving the data signal from the sound collection apparatus 200 in shooting of a moving image, the digital camera 100 performs float recording processing that is arithmetic processing for float recording from the result of two types of amplification conversion. Details of the float recording operation by the sound collection apparatus 200 and the digital camera 100 of the present system 10 and details of communication operation will be described later.

For the float recording operation, in the digital camera 100, the image sensor 115 performs imaging of each frame of the moving image, and the image processing engine 120 sequentially generates image data of each frame of the moving image. According to the digital camera 100 of the present embodiment, the controller 135 generates a moving image file by performing encoding or the like that sequentially associates audio data of float recording obtained as described above with image data of each frame. The generated moving image file is recorded in the memory card 142 from the card slot 140, for example.

According to the above operation of the present system 10, when the user shoots a moving image, float recording can be performed in the digital camera 100, and avoiding recording accidents such as clipping or insufficient volume during shooting of the moving image can be facilitated, for example. Further, complicated labor such as adjustment of recording level setting performed by a conventional digital camera at the time of shooting a moving image can be saved, and the user can easily obtain a highly accurate sound collection result with concentrating on a composition of shooting of the moving image, for example.

According to the present system 10, the user can obtain audio data of float recording in the moving image file obtained as a result of shooting the moving image by the digital camera 100, for example. Accordingly, as compared with a case where equipment for performing float recording is separately prepared for example, it is possible to save labor for the user to perform editing such as replacing audio data of a sound collection result of the other equipment with audio data of the moving image file after shooting, and it is possible for the user to facilitate using float recording.

2-1. Float Recording Operation

Figures 5A, 5B, 5C, 5D, 5E, 5F:
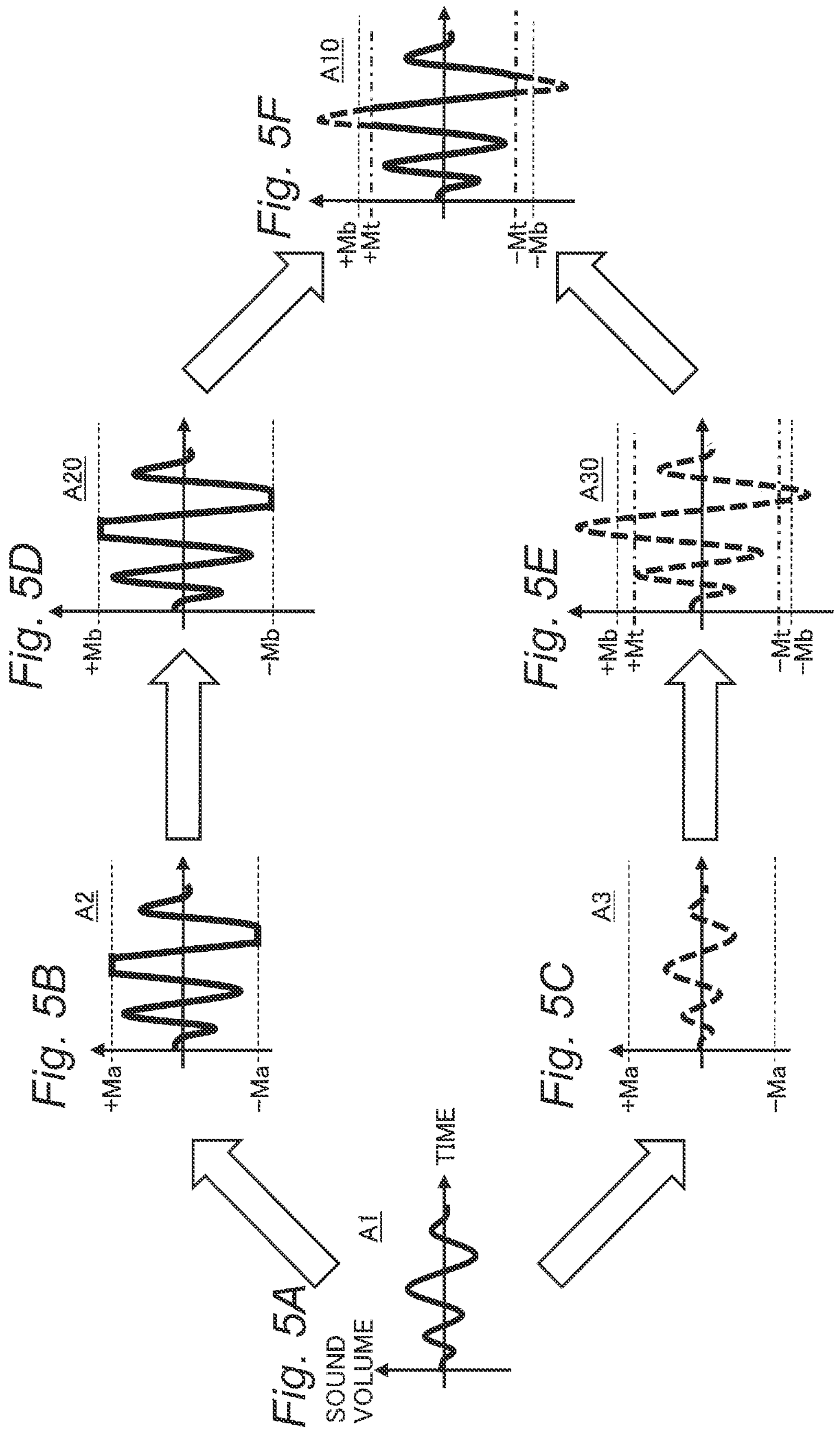
FIGS. 5A to 5F are waveform diagrams for explaining float recording operation in the imaging system.
Figure 6:
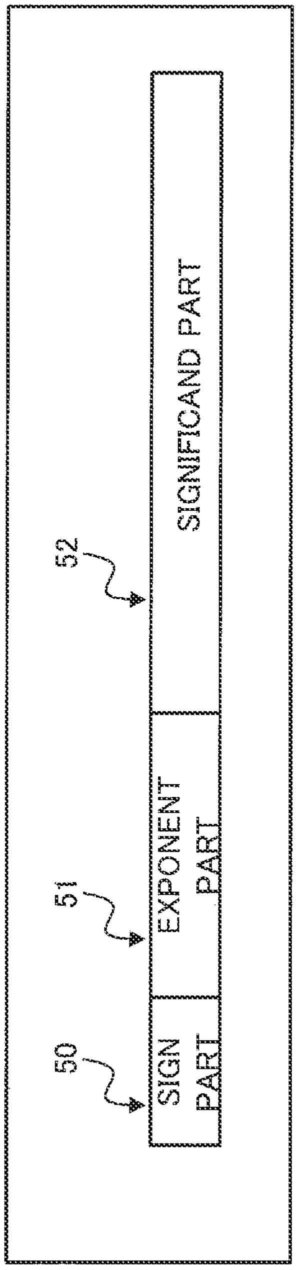
FIG. 6 is a diagram for explaining a data structure of a float format.

Float recording operation in the present system 10 will be described in detail with reference to FIGS. 4 to 6.

FIGS. 5A to 5F are waveform diagrams for explaining the float recording operation in the present system 10. FIG. 6 is a diagram for explaining a data structure of a float format.

In the sound collection apparatus 200 of the present system 10, an input audio signal A1 indicating input sound acquired by the sound input interface 210 is input to each of the H level signal processor 220 and the L level signal processor 230 as illustrated in FIG. 4. An example of the input audio signal A1 is illustrated in FIG. 5A. In the waveform diagram of FIG. 5A, the horizontal axis represents time and the vertical axis represents sound volume (the same applies hereinafter).

In the H level signal processor 220, the amplifier 222 amplifies the input audio signal A1 with the gain Ga set to be relatively larger. The A/D converter 224 performs A/D conversion for converting an amplification result of the input audio signal A1 in the amplifier 222 from an analog signal to a digital signal, and generates an H level audio signal A2. Such processing of the input audio signal A1 in the H level signal processor 220 is an example of first amplification conversion in the present embodiment.

FIG. 5B exemplifies the H level audio signal A2 obtained from the input audio signal A1 in the example of FIG. 5A. In the example of FIG. 5B, waveform distortion occurs in the H level audio signal A2 in the vicinity of a maximum value Ma that can be output by each of the signal processors 220 and 230. On the other hand, according to the H level audio signal A2, a signal-to-noise ratio is higher as the gain Ga is larger.

In the L level signal processor 230, the amplifier 232 amplifies the input audio signal A1 with the gain Gb set to be relatively smaller. The A/D converter 234 performs A/D conversion for an amplification result of the input audio signal A1 in the amplifier 232 from an analog signal to a digital signal to generate an L level audio signal A3. Such processing of the input audio signal A1 in the L level signal processor 230 is an example of second amplification conversion in the present embodiment.

FIG. 5C exemplifies the L level audio signal A3 obtained from the input audio signal A1 in the example of FIG. 5A. The L level audio signal A3 is less likely to cause signal waveform distortion than the H level audio signal A2. On the other hand, a signal-to-noise ratio is lower as the gain Gb is smaller.

Each of the audio signals A2 and A3 generated by the sound collection apparatus 200 is a digital signal in a fixed format, indicating sound as a digital value in a predetermined dynamic range (±Ma) and resolution. The present system 10 performs remaining arithmetic processing for float recording on the two types of the audio signals A2 and A3 generated as described above in the digital camera 100.

In the digital camera 100 according to the present embodiment, as illustrated in FIG. 4, the audio processing engine 170 performs calculation corresponding to each of the data conversion unit 172, the amplification unit 174 and the combining unit 176, to perform float calculation processing, for example.

In the audio processing engine 170 of the digital camera 100, first, the data conversion unit 172 converts each of the audio signals A2 and A3, received from the sound collection apparatus 200, from audio data of the fixed format to audio data of a float format. A data structure of the float format will be described with reference to FIG. 6.

The float format is a data format in which a data value is represented by a floating point type. As illustrated in FIG. 6, the data structure of the float format includes a sign part 50, an exponent part 51, and a significand part 52, for example.

The sign part 50 is a part indicating a positive or negative sign in a bit string indicating the data structure of the float format, for example. The sign part 50 may be appropriately omitted from the data structure of the float format.

The exponent part 51 is a part indicating an exponent to be used in exponent notation of the data value in the bit string of the float format. The exponent notation has a base number of two as a binary number, for example. According to the exponent part 51, a level of sound volume corresponding to a position of a decimal point in such notation is managed.

The significand part 52 is a part indicating a significant figure of the data value in the bit string of the float format. For example, as the number of bits allocated to the exponent part 52 is larger, the resolution of audio data is higher.

In the float format, a predetermined amount of bit numbers defining the bit string is allocated and set in advance among the sign part 50, the significand part 52, and the exponent part 51. For example, in 32 bit float recording, the sign part 50 has 1 bit, the exponent part 51 has 7 bits, and the significand part 52 has 24 bits. According to audio data of such a float format, resolution corresponding to the number of bits of the significand part 52 can be obtained over a sound volume level corresponding to the number of bits of the exponent part 51.

For example, the audio processing engine 170 serving as the data conversion unit 172 sequentially calculates a value of the exponent part 51 and a value of the significand part 52 so as to normalize a data value indicated by the H level audio signal A2 for each time in a floating point type, and generates audio data of the float type. Further, the audio processing engine 170 similarly performs normalization operation of the floating point type also for the L level audio signal A3 to generate audio data of the float format. The audio data generated as the above shows a larger sound volume as the value of the exponent part 51 is larger. For example, the normalization is performed by increasing the value of the exponent part 51 in turn until the most significant digit of the significand part 52 is no longer zero.

Returning to FIG. 4, in the audio processing engine 170, the amplification unit 174 performs amplification operation to offset a difference between the gains Ga and Gb, based on gain information indicating the gains Ga and Gb of the amplifiers 222 and 232 in the sound collection apparatus 200, for example.

For example, in the audio processing engine 170, the amplification unit 174 calculates an H level audio data A20 so that a conversion result of the H level audio signal A2 into the float format is amplified by the lower gain Gb in floating point operation. Similarly, the amplification unit 174 calculates an L level audio data A30 so as to amplify, by the higher gain Ga, a conversion result of the L level audio signal A3.

FIG. 5D illustrates the H level audio data A20 calculated from the H level audio signal A2 in FIG. 5B. FIG. 5E illustrates the L level audio data A30 calculated from the L level audio signal A3 in FIG. 5C. According to the calculation of the amplification unit 174, as illustrated in FIGS. 5D and 5E, the magnitude of sound volume can be equalized between the H level audio data A20 and the L level audio data A30, for example.

Next, the combining unit 176 in the audio processing engine 170 generates audio data A10 of float recording by arithmetic processing of combining the H level audio data A20 and the L level audio data A30 by switching therebetween, for example. FIG. 5F illustrates the audio data A10 of float recording generated from the audio data A20 and A30 of FIGS. 5D and 5E.

For example, the combining unit 176 compares the magnitude (absolute value) of the L level audio data A30 with a predetermined threshold Mt, and in the case that the L level audio data A30 is equal to or more than the threshold Mt, employs the L level audio data A30 as the audio data A10 of float recording. On the other hand, in the case that the L level audio data A30 is less than the threshold Mt, the combining unit 176 employs the H level audio data A20 as the audio data A10 of float recording. For example, the threshold Mt is set in the vicinity of a value Mb corresponding to the maximum value Ma of output from each of the signal processors 220 and 230 or less in each piece of the audio data A20 and A30.

According to the float recording operation described above, in the present system 10, the sound collection apparatus 200 and the digital camera 100 cooperate with each other to obtain the audio data A10 of float recording that accurately shows input sound acquired by the sound collection apparatus 200. For example, it is not necessary to provide an arithmetic circuit capable of performing floating point operation particularly in the sound collection apparatus 200, and thus a device configuration of the sound collection apparatus 200 can be simplified.

According to the processing of the combining unit 176, influence of signal distortion in the H level audio data A20 is easily avoided by using the L level audio data A30 for threshold determination. For example, as illustrated in FIGS. 5E and 5F, in a range of large sound volume that is enough to cause signal distortion in the H level audio data A20, the L level audio data A30 is employed, and thus influence of the signal distortion can be reduced in the audio data A10 of float recording. For example, as illustrated in FIGS. 5D and 5F, a signal-to-noise ratio can be improved by employing the H level audio data A20 as a sound collection result except for the large sound volume range.

The combining unit 176 may perform various arithmetic processing of combining the H level audio data A20 and the L level audio data A30, and a hysteresis may be provided in the threshold determination as described above, for example. For example, when the H level audio data A20 and the L level audio data A30 are frequently switched by threshold determination, the audio data may be temporarily fixed to the L level audio data A30. By such arithmetic processing, it is possible to reduce uncomfortable feeling on audibility in the audio data A10 of float recording.

For example, in the present embodiment, the combining unit 176 may perform arithmetic processing such as floating point operation of combining the H level audio data A20 and the L level audio data A30 at a predetermined combination ratio, instead of the arithmetic processing of combining the audio data A20 and A30 by switching therebetween. Also by such arithmetic processing, the digital camera 100 of the present embodiment can obtain the audio data A10 of float recording.

For example, the amplification unit 174 may correct an amplification factor by comparing the gains Ga and Gb indicated by gain information with a difference between both the audio signals A2 and A3, to perform the above-described amplification processing. According to this, a robust system can be obtained, which is not likely to affect the combining even when a difference in amplification factors may occur due to manufacturing variations of amplifiers or the like.

2-2. Communication Operation

Details of communication operation between the sound collection apparatus 200 and the digital camera 100 in the present system 10 will be described with reference to FIGS. 7 to 8. Hereinafter, an example in which the digital camera 100 operates as a master in BLE communication and the sound collection apparatus 200 operates as a slave in the present system 10 will be described.

Figure 7:
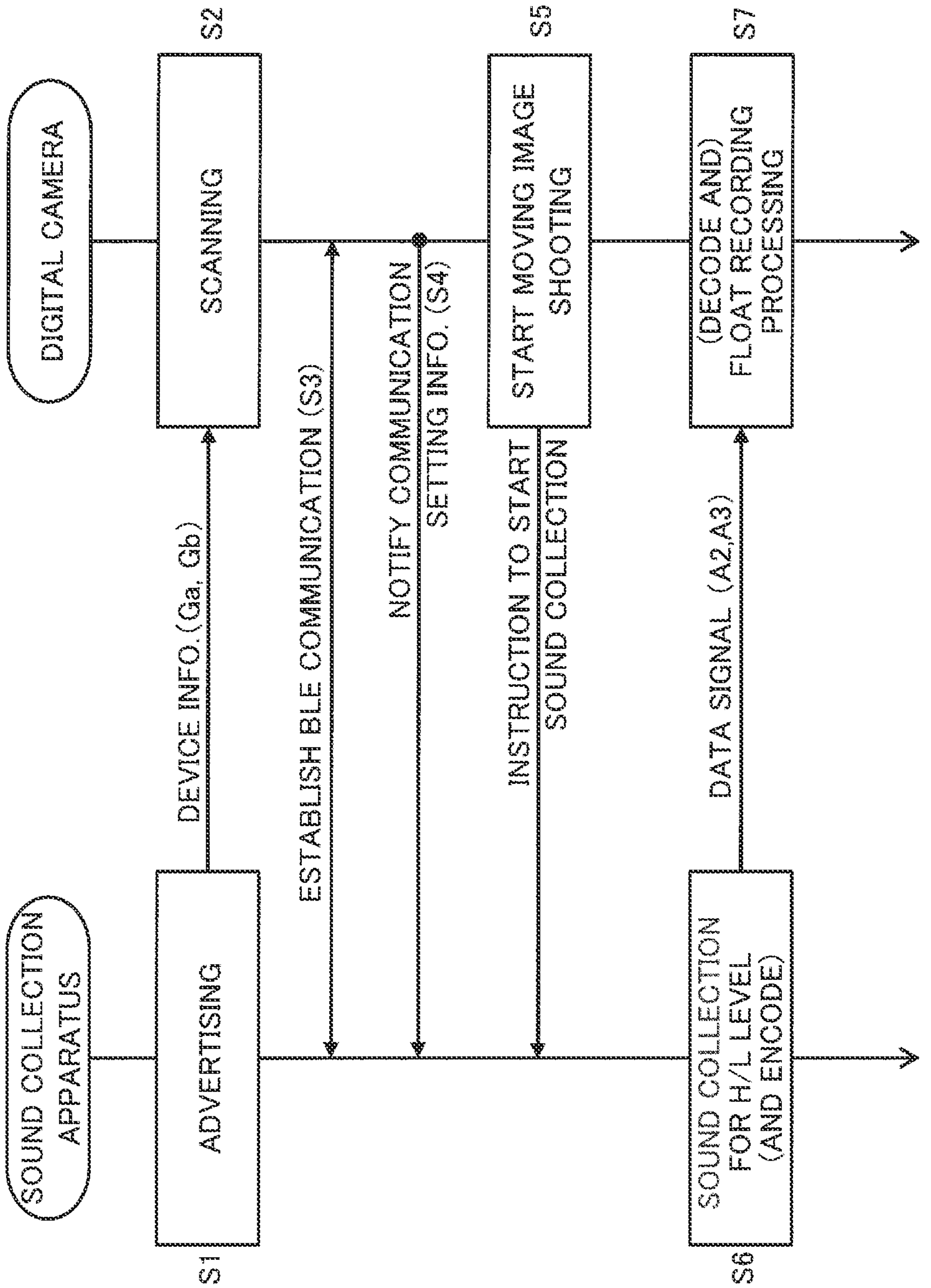
FIG. 7 is a sequence diagram exemplifying communication operation in the imaging system.

FIG. 7 is a sequence diagram illustrating the communication operation in the present system 10. FIG. 8 is a diagram illustrating a structure example of a communication packet in the present system 10.

For example, before communication of the present system 10 is established, the sound collection apparatus 200 performs advertising in which device information indicating the specification of the own device is broadcast-transmitted (S1). The digital camera 100 performs scanning for searching for a device to which BLE communication is applicable (S2). In this way, the digital camera 100 receives the device information from the sound collection apparatus 200, and a communication connection between the sound collection apparatus 200 and the digital camera 100 is established (S3).

For example, when such communication of the present system 10 is established (S1 to S3), the controller 240 of the sound collection apparatus 200 includes gain information indicating the gains Ga and Gb of the amplifiers 222 and 232 stored in the memory 250 in device information and causes the communication interface 260 to transmit the device information (S1). Then, the communication module 160 of the digital camera 100 receives the gain information from the sound collection apparatus 200 (S2). The device information may include identification information of the sound collection apparatus 200 and whether or not the own device is applicable to float recording operation.

Next, the controller 135 of the digital camera 100 notifies the sound collection apparatus 200 of communication setting information indicating various settings in the established communication connection (S4). For example, the communication setting information includes a packet length for performing float recording operation and packet allocation setting (see FIG. 8). The communication interface 260 of the sound collection apparatus 200 receives the communication setting information from the digital camera 100 (S4).

After the above, upon starting shooting of a moving image in response to user operation (S5), the digital camera 100 instructs the sound collection apparatus 200 to start operation of sound collection, for example. For example, the notification of the communication setting information (S4) may be performed at the start of shooting of the moving image (S5) or may be performed together with instruction to start sound collection. For example, in response to the instruction from the digital camera 100 (S5), the sound collection apparatus 200 performs amplification conversion and encoding for float recording (S6).

In Step S6, the signal processors 220 and 230 (FIG. 4) in the sound collection apparatus 200 respectively perform two types of amplification conversion in parallel for each channel of the input audio signals A1, to generate the H level audio signal A2 and the L level audio signal A3 for each channel, for example. Furthermore, in the sound collection apparatus 200 of the present embodiment, a data signal is encoded into a communication packet so that the generated audio signals A2 and A3 are transmitted to the digital camera 100 at the same timing with each other.

Figure 8:
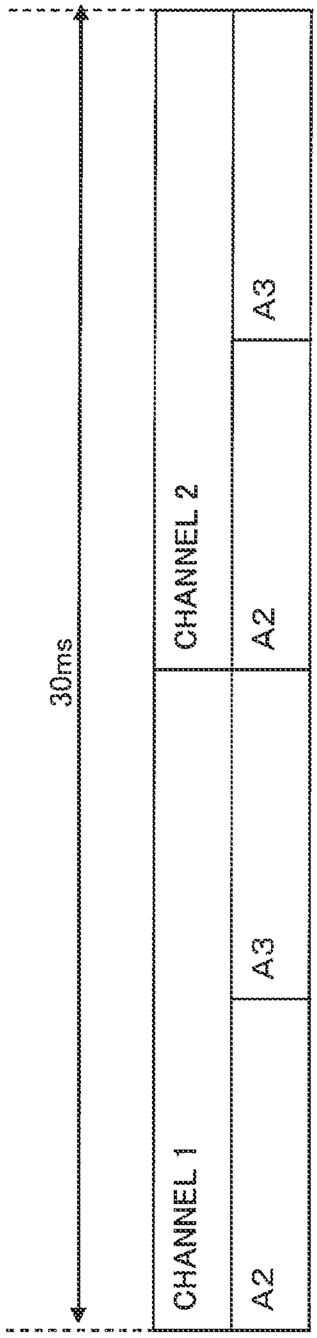
FIG. 8 is a diagram illustrating a structure example of a communication packet in the imaging system.

FIG. 8 illustrates a structure example of the communication packet in the present system 10. In the example of FIG. 8, the communication packet for an input audio signal of two channels is exemplified. The communication packet in this example has two segments per channel in a packet length of 30 milliseconds. The communication packet is an example of a communication unit of the present embodiment.

In the communication packet exemplified in FIG. 8, in each channel, the H level audio signal A2 is stored in one segment, and a data value of the L level audio signal A3 is stored in another segment. In Step S6, the encoder 245 of the sound collection apparatus 200 encodes the audio signals A2 and A3 by sequentially configuring such communication packets in accordance with the communication setting information received in Step S4, for example. The communication interface 260 of the sound collection apparatus 200 transmits, to the digital camera 100, a data signal generated as a processing result of the encoder 245 and constituted by the communication packet described above.

In the communication module 160, the digital camera 100 receives a data signal from the sound collection apparatus 200 and performs decoding of the data signal and float recording processing (S7). First, the controller 135 of the digital camera 100, serving as the decoder 165, decodes the data signal from the sound collection apparatus 200, to acquire the H level audio signal A2 and the L level audio signal A3, for example.

Furthermore, in Step S7, the audio processing engine 170 of the digital camera 100 performs the float recording processing described above, based on the acquired audio signals A2 and A3, to generate the audio data A10 of float recording (see FIG. 4). For example, such float recording processing is performed using the gain information (Ga, Gb) acquired in Step S2. For example, the controller 135 of the digital camera 100 can generate a moving image file by associating the audio data A10 generated in this manner with image data shot at the same time.

According to the communication operation in the present system 10 described above, it is possible to realize float recording of multiple channels by wireless communication of a data signal between the sound collection apparatus 200 and the digital camera 100.

FIG. 8 exemplifies the communication packet in a case of two channels. In the present system 10, a data signal is not particularly limited to two channels, and may be one channel, or three or more channels. For example, in a case of one channel, latency may be reduced by sequentially storing data values of the audio signals A2 and A3 of the same channel in two segments for each channel of the communication packet illustrated in FIG. 8.

In the above description, an example in which the gain information from the sound collection apparatus 200 is transmitted/received when communication of the present system 10 is established (S1 to S3) is described. In the present system 10, transmission and receiving of the gain information may be performed, without limitation to the above in particular, after establishment of communication between the sound collection apparatus 200 and the digital camera 100, for example.

3. Summary

As described above, in the present embodiment, the digital camera 100 as an example of an imaging apparatus includes the image sensor 115 as an example of an image sensor, the audio processing engine 170 as an example of an audio processor, and the communication module 160 as an example of a receiver. The image sensor 115 captures a subject image and generates image data. The audio processing engine 170 generates audio data associated with image data. The communication module 160 receives the H level audio signal A2 as an example of a first audio signal and the L level audio signal A3 as an example of a second audio signal from the external sound collection apparatus 200. The H level audio signal A2 indicates a result of processing of the H level signal processor 220 as an example of first amplification conversion performed on input sound in the sound collection apparatus 200. The L level audio signal A3 indicates a result of processing of the L level signal processor 230 as an example of second amplification conversion different from the first amplification conversion performed on input sound in the sound collection apparatus 200. The audio processing engine 170 receives input of the audio signals A2 and A3 received from the communication module 160, performs processing of combining the audio signals with each other in a float format as an example of a predetermined data format, and generates the audio data A10 of a sound collection result showing input sound in the data format.

According to the digital camera 100 described above, processing for generating audio data in a float format is performed in the audio processing engine 170, so that it is possible to easily obtain audio data indicating a sound collection result in a predetermined data format by using the sound collection apparatus 200 and the digital camera 100.

In the present embodiment, in the first amplification conversion, input sound is amplified in the amplifier 222 as an example of a first amplifier to which the gain Ga as an example of first gain is set and A/D conversion is performed, so that the H level audio signal A2 is generated. In the second amplification conversion, input sound is amplified in the amplifier 232 as an example of a second amplifier to which the gain Gb as an example of second gain smaller than the first gain is set and A/D conversion is performed, so that the L level audio signal A3 is generated. In the audio data A10 as a sound collection result, a sound volume of a portion corresponding to a first audio signal is equal to or more than a sound volume of a portion corresponding to a second audio signal. In this way, as a sound collection result of the present system 10, it is possible to obtain the audio data A10 of input sound accurately acquired in a wide dynamic range by using the audio signals A2 and A3.

In the present embodiment, the audio processing engine 170 acquires gain information indicating the gains Ga and Gb in the sound collection apparatus 200, and generates the audio data A10 as a sound collection result from the audio signals A2 and A3 by using the acquired gain information. The audio data A10 of a sound collection result can be accurately generated using such gain information. For example, the audio processing engine 170 uses gain information to generate the audio data A10 as a sound collection result in such a manner that a difference between the gains Ga and Gb in the audio signals A2 and A3 is reduced.

In the present embodiment, the audio processing engine 170 acquires gain information by information communication with the sound collection apparatus 200 in the communication module 160. In this way, the digital camera 100 can easily acquire gain information of the sound collection apparatus 200, and easily obtain the audio data A10 with high accuracy.

In the present embodiment, the predetermined data format is a float format having the significand part 52 and the exponent part 51. The audio processing engine 170 generates the audio data A10 as a sound collection result such that the exponent part 51 is made larger as a sound volume of input sound is larger. In this way, the digital camera 100 according to the present embodiment can generate the audio data A10 as a sound collection result with high accuracy by using a float format.

In the present embodiment, the communication module 160 receives a data signal conforming to a predetermined communication standard from the sound collection apparatus 200. The data signal includes, for each communication packet as an example of a communication unit in a communication standard, a segment as an example of a first portion in which the H level audio signal A2 is stored and an example of a second portion in which the L level audio signal A3 is stored (see FIG. 8). In this way, the digital camera 100 can easily obtain the audio data A10 as a sound collection result by data communication between the digital camera 100 and the sound collection apparatus 200.

In the present embodiment, the digital camera 100 further includes the controller 135 that generates a moving image file by associating the audio data A10 of a sound collection result with image data. According to the digital camera 100 of the present embodiment, the audio data A10 of a sound collection result in the data format can be obtained in a moving image file of a result of moving image shooting, and such moving image shooting can be facilitated for the user.

In the present embodiment, the sound collection apparatus 200 transmits an audio signal to the digital camera 100 by transmitting a data signal including the audio signals A2 and A3. The sound collection apparatus 200 includes the sound input interface 210 that acquires input sound, the H level signal processor 220 as an example of a first signal processor that performs first amplification conversion on input sound to generate a first audio signal, the H level signal processor 230 as an example of a second signal processor that performs second amplification conversion different from the first amplification conversion on input sound to generate a second audio signal, and the communication interface 260 as an example of a transmitter that transmits the first audio signal and the second audio signal to an imaging apparatus. The sound collection apparatus 200 according to the present embodiment makes it easy to obtain audio data showing a sound collection result in a predetermined data format by using the sound collection apparatus 200 and the digital camera 100.

In the present embodiment, the imaging system 10 includes the sound collection apparatus 200 described above, and the digital camera 100 that receives first and second audio signals from the sound collection apparatus 200, using the received first and second audio signals as input to perform processing of combining them in a predetermined data format, and generates the audio data A10 of a sound collection result showing input sound in the data format. According to the present system 100, it is facilitated to obtain audio data showing a sound collection result in a predetermined data format by using the sound collection apparatus 200 and the digital camera 100.

Other Embodiments

As described above, the first embodiment is described as an example of the technique disclosed in the present application. However, the technique in the present disclosure is not limited to this, and is also applicable to an embodiment in which changes, replacements, additions, omissions, and the like are appropriately made. Further, the constituent elements described in the above-described embodiment can also be combined to form a new embodiment. In view of the above, other embodiments will be exemplified below.

In the first embodiment, the operation example in which the digital camera 100 receives gain information from the sound collection apparatus 200 is described, but the present embodiment is not limited to this. For example, in the flash memory 145 of the digital camera 100 of the present embodiment, gain information may be stored in advance for each model of the sound collection apparatus 200. The digital camera 100 of the present embodiment may receive identification information of the sound collection apparatus 200 instead of gain information, and may acquire gain information from flash memory 145 based on such identification information.

Further, in the present embodiment, gain information and the like may be acquired not only from the sound collection apparatus 200 but also via user operation. Such a variation will be described with reference to FIG. 9.

Figure 9:
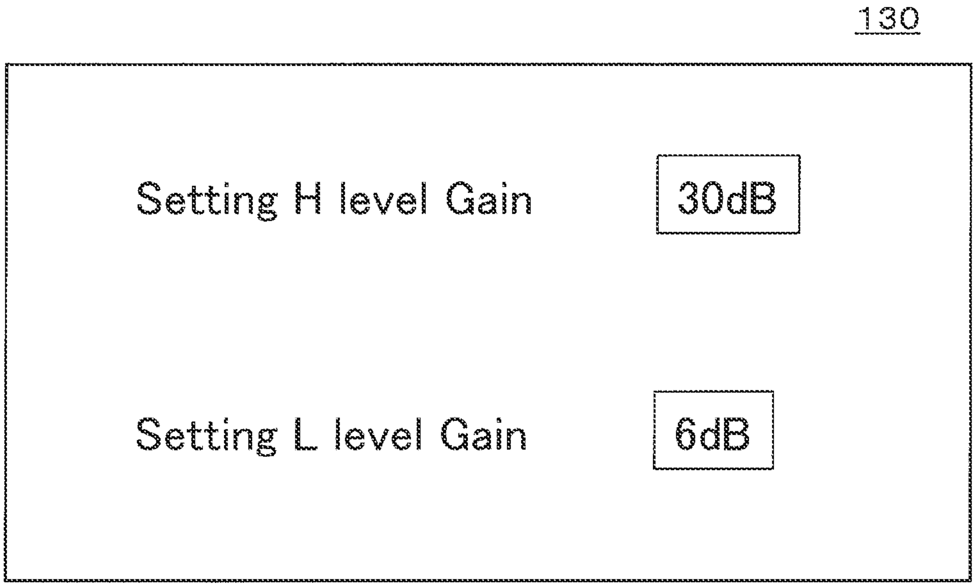
FIG. 9 is a table illustrating a display example in the digital camera according to a variation.

FIG. 9 illustrates a display example of the display monitor 130 in the digital camera 100 according to the variation. For example, the digital camera 100 of the present embodiment displays an operation screen on which the gain Ga of the H level signal processor 220 and the gain Gb of the L level signal processor 230 can be changed on the display monitor 130, and receives user operation of the operation screen on the operation member 150.

In the example of FIG. 9, numerical values of the gains Ga and Gb are displayed in a changeable manner. For example, the digital camera 100 may display an option of numerical values of the gains Ga and Gb for each model of the sound collection apparatus 200. Alternatively, the digital camera 100 may display a model of the sound collection apparatus 200 as an option and receive user operation for the selection. The digital camera 100 according to the present embodiment may acquire gain information in accordance with input of various user operation as described above.

In the above embodiments, the example in which the sound collection apparatus 200 and the digital camera 100 perform BLE communication to realize float recording is described. In the present embodiment, the sound collection apparatus 200 and the digital camera 100 may realize float recording by wireless communication or wired communication other than BLE communication. For example, the sound collection apparatus 200 according to the present embodiment may perform USB standard wired communication with the digital camera 100 to perform data transmission for the audio signals A2 and A3.

In the above embodiments, the sound collection apparatus 200 including two of the signal processors 220 and 230 for input sound of one channel is described. The sound collection apparatus 200 according to the present embodiment may include three or more signal processors for input sound of one channel. In the sound collection apparatus 200 of the present embodiment, each gain may be set so that a dynamic range is shared among three or more signal processors. The digital camera 100 of the present embodiment may generate audio data of a float format so as to use sound accurately collected in each audio signal based on an audio signal of a sound collection result of each of the three or more signal processors.

In the above embodiments, the example in which the sound collection apparatus 200 does not perform float recording processing is described. In the present embodiment, the sound collection apparatus 200 may perform float recording processing, and may further include a configuration such as an arithmetic circuit that realizes such arithmetic processing. Alternatively, the sound collection apparatus 200 may further include a recording function different from float recording. Even in such a case, for example, the sound collection apparatus 200 can transmit the audio signals A2 and A3 to the digital camera 100 as in the first embodiment, so that the digital camera 100 can also perform float recording processing, and calculation load of the sound collection apparatus 200 can be reduced, for example. Similarly to the above embodiment, the sound collection apparatus 200 according to the present embodiment allows audio data showing a sound collection result in a float form to be obtained easily by using the sound collection apparatus 200 and the digital camera 100.

In the above embodiments, the example in which the sound collection apparatus 200 transmits data of the audio signals A2 and A3 to the digital camera 100, and the digital camera 100 performs float recording processing. In the present embodiment, the sound collection apparatus 200 may perform data transmission to an audio processing device such as various electronic devices other than an imaging apparatus such as the digital camera 100. In the present embodiment, such an audio processing device may perform float recording processing similarly to the digital camera 100 of the first embodiment.

That is, the audio processing device according to the present embodiment is an imaging apparatus including an audio processor that generates audio data and a receiver that receives a first audio signal and a second audio signal from an external sound collection apparatus. The first audio signal shows a result of first amplification conversion performed on input sound in the sound collection apparatus. The second audio signal shows a result of second amplification conversion different from the first amplification conversion performed on the input sound in the sound collection apparatus. The audio processor generates audio data of a sound collection result showing input sound in a predetermined data format based on the first and second audio signals received from the receiver. By the above, in the present embodiment, it is possible to easily obtain audio data showing a sound collection result in a float type by using the sound collection apparatus and the audio processing device that perform data communication.

In the above embodiments, a float format is exemplified as an example of the predetermined data format. In the present embodiment, the predetermined data format is not necessarily limited to a float format, and may be, for example, various data formats in which each resolution can be kept between sounds having a sound volume significantly different from a range of resolution of sound.

Further, in each of the above embodiments, the memory card 142 is exemplified as a recording medium, and the card slot 140 is exemplified as a recording unit of the digital camera 100, but the recording unit is not limited to this. In the present embodiment, the recording medium is not limited to a memory card, and may be, for example, an external storage device such as an SSD drive. Further, the digital camera 100 according to the present embodiment may upload a moving image file or the like to a cloud server or the like via the communication module 160, for example.

Further, in each of the above embodiments, the digital camera 100 including the optical system 110 and the driver 112 is exemplified. The imaging apparatus of the present embodiment does not need to include the optical system 110 or the driver 112, and may be, for example, an interchangeable lens type camera.

Further, in each of the above embodiments, the digital camera is described as an example of the imaging apparatus, but the present disclosure is not limited to this. The imaging apparatus of the present disclosure may be an electronic apparatus having an image capturing function (e.g., a video camera, a smartphone, a tablet terminal, or the like).

Summary of Aspects

Hereinafter, various aspects according to the present disclosure will be appended.

A first aspect according to the present disclosure is an imaging apparatus including: an image sensor that captures a subject image to generate image data; an audio processor that generates audio data associated with the image data; and a receiver that receives a first audio signal and a second audio signal from an external sound collection apparatus, wherein the first audio signal indicates a result of first amplification conversion performed on input sound in the sound collection apparatus, the second audio signal indicates a result of second amplification conversion performed on the input sound in the sound collection apparatus, the second amplification conversion being different from the first amplification conversion, and the audio processor performs processing to combine the first and second audio signals with each other, to generate the audio data of a sound collection result, the first and second audio signals being received from the receiver as input, the audio data of the sound collection result indicating the input sound in a predetermined data format.

A second aspect according to the present disclosure includes the imaging apparatus according to the first aspect, wherein the first amplification conversion generates the first audio signal by amplifying the input sound in a first amplifier and performing analogue-to-digital conversion thereon, the first amplifier having a first gain that is set therein, the second amplification conversion generates the second audio signal by amplifying the input sound in a second amplifier and performing analogue-to-digital conversion thereon, the second amplifier having a second gain that is set to be smaller than the first gain, and in the audio data of the sound collection result, a sound volume of a portion corresponding to the first audio signal is equal to or more than a sound volume of a portion corresponding to the second audio signal.

A third aspect according to the present disclosure includes the imaging apparatus according to the second aspect, wherein the audio processor acquires gain information set to the first and second amplifiers in the sound collection apparatus, and generates the audio data of the sound collection result from the first and second audio signals, based on the gain information.

A fourth aspect according to the present disclosure includes the imaging apparatus according to the third aspect, wherein the audio processor acquires the gain information, via information communication with the sound collection apparatus by the receiver.

A fifth aspect according to the present disclosure includes the imaging apparatus according to any one of the first to fourth aspects, wherein the predetermined data format is a float format having a significand part and an exponent part, and the audio processor generates the audio data of the sound collection result to increase the exponent part more as a sound volume of the input sound is larger.

A sixth aspect according to the present disclosure includes the imaging apparatus according to any one of the first to fifth aspects, wherein the receiver receives a data signal from the sound collection apparatus, the data signal conforming to a predetermined communication standard, and the data signal includes a first portion and a second portion for each communication unit in the communication standard, the first portion storing the first audio signal and the second portion storing the second audio signal.

A seventh aspect according to the present disclosure includes the imaging apparatus according to any one of the first to sixth aspects, further including a controller that generates a moving image file by associating the audio data of the sound collection result with the image data.

An eighth aspect according to the present disclosure is a sound collection apparatus that transmits an audio signal to an imaging apparatus, the sound collection apparatus including: a sound input interface that acquires input sound; a first signal processor that performs first amplification conversion on the input sound to generate a first audio signal; a second signal processor that performs second amplification conversion on the input sound to generate a second audio signal, the second amplification conversion being different from the first amplification conversion; and a transmitter that transmits the first audio signal and the second audio signal to the imaging apparatus.

A ninth aspect according to the present disclosure is an imaging system including: the sound collection apparatus according to the eighth aspect; and the imaging apparatus that receives the first and second audio signals as input from the sound collection apparatus, and performs processing to combine the received first and second audio signals with each other, to generate the audio data of a sound collection result indicating the input sound in a predetermined data format.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be certified that these non-essential components are essential immediately because these non-essential components are described in the accompanying drawings and the detailed description.

In addition, since the above embodiment is for exemplifying the technique in the present disclosure, various changes, substitutions, additions, omissions, and the like can be made within the scope of the claims or the equivalent thereof.

The present disclosure is applicable to an imaging apparatus that receives an audio signal from a sound collection apparatus, a sound collection apparatus, and an imaging system including these apparatuses.

The invention claimed is:

1. An imaging apparatus comprising:

an image sensor that captures a subject image to generate image data;

an audio processor that generates audio data associated with the image data; and a receiver that receives a first audio signal and a second audio signal from an external sound collection apparatus, wherein the first audio signal indicates a result of first amplification conversion performed on input sound in the sound collection apparatus, the second audio signal indicates a result of second amplification conversion performed on the input sound in the sound collection apparatus, the second amplification conversion being different from the first amplification conversion, and the audio processor performs processing to combine the first and second audio signals with each other, to generate the audio data of a sound collection result, the first and second audio signals being received from the receiver as input, the audio data of the sound collection result indicating the input sound in a predetermined data format, wherein the predetermined data format is a float format having a significand part and an exponent part, and based on combination of the first and second audio signals, the audio processor generates the audio data of the sound collection result to increase the exponent part more as a sound volume of the input sound is larger.

2. The imaging apparatus according to claim 1, wherein the first amplification conversion generates the first audio signal by amplifying the input sound in a first amplifier and performing analogue-to-digital conversion thereon, the first amplifier having a first gain that is set therein, the second amplification conversion generates the second audio signal by amplifying the input sound in a second amplifier and performing analogue-to-digital conversion thereon, the second amplifier having a second gain that is set to be smaller than the first gain, and in the audio data of the sound collection result, a sound volume of a portion corresponding to the first audio signal is less than a sound volume of a portion corresponding to the second audio signal.

3. The imaging apparatus according to claim 2, wherein the audio processor acquires gain information set to the first and second amplifiers in the sound collection apparatus, and generates the audio data of the sound collection result from the first and second audio signals, based on the gain information.

4. The imaging apparatus according to claim 3, wherein the audio processor acquires the gain information, via information communication with the sound collection apparatus by the receiver.

5. The imaging apparatus according to claim 1, wherein the receiver receives a data signal from the sound collection apparatus, the data signal conforming to a predetermined communication standard, and the data signal includes a first portion and a second portion for each communication unit in the communication standard, the first portion storing the first audio signal and the second portion storing the second audio signal.

6. The imaging apparatus according to claim 1, further comprising a controller that generates a moving image file by associating the audio data of the sound collection result with the image data.

7. The imaging apparatus according to claim 1, wherein the first audio signal is generated based on a first gain in the first amplification conversion, the second audio signal is generated based on a second gain in the second amplification conversion, the second gain being smaller than the first gain, and based on the combination of the first and second audio signals, the audio processor generates the audio data of the sound collection result such that the exponent part corresponding to the second audio signal is equal to or greater than the exponent part corresponding to the first audio signal.

* * * * *